United States Patent
Yoshifuji

Patent Number: 5,450,074
Date of Patent: Sep. 12, 1995

[54] METHOD FOR SETTING BRANCH ROUTES IN A THREE-STAGE CROSS-CONNECT SWITCH SYSTEM

[75] Inventor: Yuuki Yoshifuji, Tokyo, Japan

[73] Assignee: NEC Corporation, Tokyo, Japan

[21] Appl. No.: 841,634

[22] Filed: Feb. 27, 1992

[30] Foreign Application Priority Data

Feb. 27, 1991 [JP] Japan .................. 3-077414

[51] Int. Cl.[6] .............................. H04Q 1/00
[52] U.S. Cl. .................. 340/825.8; 340/826; 340/827
[58] Field of Search .............. 340/826, 827, 825.02, 340/825.8, 825.03, 825.79; 379/268–273

[56] References Cited

U.S. PATENT DOCUMENTS 4,057,711  11/1977  Asthana et al. ............. 340/825.03
5,276,425  1/1994   Swanson et al. ............ 340/826

OTHER PUBLICATIONS

Clos, C., "A Study of Non-Blocking Switching Networks", Oct. 1952, The Bell System Technical Journal, pp. 406–423.

Hwang, F. K., "Three-Stage Multiconnection Networks Which are Nonblocking in the Wide Sense", Dec. 1979, The Bell System Technical Journal, pp. 2183–2187.

*Primary Examiner*—Michael Horabik
*Attorney, Agent, or Firm*—Foley & Lardner

[57] ABSTRACT

When setting a branch route in a three-stage cross-connect switch system having a non-blocking three-stage Clos switch configuration having input stage switches, intermediate stage switches and output stage switches, the output stage switches, the intermediate stage switches and the input stage switches are searched first, second and third, respectively, for points of branching connection with existing routes in order to avoid, as far as practicable, the use of the output terminals of input stage switches having the same switch number. The blocking of any route setting request newly emerging for one-to-one connection or branching connection can be thereby restrained.

3 Claims, 8 Drawing Sheets

1 THREE - STAGE CROSS - CONNECT SWITCH

FIG. 3

INPUT NUMBER CONVERSION TABLE (201)

| IN N(p) | INPUT STAGE SWITCH SW k(p) | INT n(p) |
|---|---|---|
| 1 | 1 | 1 |
| 2 | 1 | 2 |
| ... | 1 | ... |
| n (=3) | 1 | n |
| n+1 (=4) | 2 | 1 |
| n+2 (=5) | 2 | 2 |
| ... | 2 | ... |
| 2n (=6) | 2 | n |
| ... | ... | ... |
| k·n−n+1 (=7) | k (=3) | 1 |
| k·n−n+2 (=8) | k (=3) | 2 |
| ... | k (=3) | ... |
| k·n (=9) | k (=3) | n |

FIG. 4

OUTPUT NUMBER CONVERSION TABLE (202)

| OUT G(p) | OUTPUT STAGE SWITCH SW y(q) | OUT g(q) |
|---|---|---|
| 1 | 1 | 1 |
| 2 | 1 | 2 |
| ... | 1 | ... |
| g (=3) | 1 | g |
| g+1 (=4) | 2 | 1 |
| g+2 (=5) | 2 | 2 |
| ... | 2 | ... |
| 2g (=6) | 2 | g |
| ... | ... | ... |
| y·g−g+1 (=7) | y (=3) | 1 |
| y·g−g+2 (=8) | y (=3) | 2 |
| ... | y (=3) | ... |
| y·g (=9) | y (=3) | g |

FIG. 9

207 SECOND BRANCH NUMBER TABLE

| INPUT STAGE SWITCH | |
|---|---|
| SW k(p) | BRB |
| 1 | "0" |
| 2 | "0" |
| ... | ... |
| k(=3) | "1" |

FIG. 7

205 FIRST BRANCH NUMBER TABLE

| INTERMEDIATE STAGE SWITCH | |
|---|---|
| SW m(j) | BRA |
| 1 | "0" → "1" |
| 2 | "0" → "1" |
| 3 | "0" |
| 4 | "0" |
| ... | ... |
| m(=5) | "0" |

FIG. 5

203 INPUT-OUTPUT NUMBER CONNECTION STATUS TABLE

| IN N(p) | OUT G(q) | |
|---|---|---|
| 1 | 5 | --- RT1 |
| 3 | 8 | --- RT2 |
| 7 | 2 | --- RT3 |
| 7 | 1 | --- RT4 |
| 7 | 9 | --- RT5 |
| 7 | 4 | --- RT6 |

FIG. 6.

204 INTERMEDIATE STAGE SWITCH CONNECTION STATUS TABLE

| SW m(j) | INT k(j) | | OUTT y(j) | |
|---|---|---|---|---|
| 1 | 1 | "0"→"1" | 1 | "0"→"1" |
| | 2 | "0" | 2 | "0"→"1" |
| | ⋮ | ⋮ | ⋮ | ⋮ |
| | k (=3) | "0"→"1" | y (=3) | "0"→"1" |
| 2 | 1 | "0"→"1" | 1 | "0" |
| | 2 | "0" | 2 | "0"→"1" |
| | ⋮ | ⋮ | ⋮ | ⋮ |
| | k | "0"→"1" | y | "0"→"1" |
| ⋮ | ⋮ | ⋮ | ⋮ | ⋮ |
| m (=5) | 1 | "0" | 1 | "0" |
| | 2 | "0" | 2 | "0" |
| | ⋮ | ⋮ | ⋮ | ⋮ |
| | k | "0" | y | "0" |

FIG.8

206 ROUTE CONNECTION STATUS TABLE

| OUTPUT STAGE SWITCH | | | | INTERMEDIATE STAGE SWITCH | | | INPUT STAGE SWITCH | | | | |
|---|---|---|---|---|---|---|---|---|---|---|---|
| OUT G(q) | SW y(q) | OUT g(q) | INT m(q) | OUT y(j) | SW m(j) | INT k(j) | OUT m(p) | INT n(p) | SW k(p) | IN N(p) | |
| 1 | 1 | 1 | 1 | 1 | 1 | 3 | 1 | 1 | 3 | 7 | ---- RT4 |
| 2 |   | 2 | 1 | 1 | 1 | 3 | 1 | 1 | 3 | 7 | ---- RT3 |
| ... |   | ... |   |   |   |   |   |   |   |   |   |
| g (=3) |   | g |   |   |   |   |   |   |   |   |   |
| g+1 (=4) | 2 | 1 | 2 | 2 | 2 | 3 | 2 | 1 | 3 | 7 | ---- RT6 |
| g+2 (=5) |   | 2 | 1 | 2 | 1 | 1 | 1 | 1 | 1 | 1 | ---- RT1 |
| ... |   | ... |   |   |   |   |   |   |   |   |   |
| 2g (=6) |   | g |   |   |   |   |   |   |   |   |   |
| ... |   | ... |   |   |   |   |   |   |   |   |   |
| y·g-g+1 (=7) | y (=3) | 1 | 2 | 3 | 2 | 1 | 2 | 3 | 1 | 3 | ---- RT2 |
| y·g-g+2 (=8) |   | 2 | 1 | 3 | 1 | 3 | 1 | 1 | 3 | 7 | ---- RT5 |
| ... |   | ... |   |   |   |   |   |   |   |   |   |
| y·g (=9) |   | g |   |   |   |   |   |   |   |   |   |

METHOD FOR SETTING BRANCH ROUTES IN A THREE-STAGE CROSS-CONNECT SWITCH SYSTEM

BACKGROUND OF THE INVENTION

The present invention relates to a three-stage cross-connect switch system, and more particularly to a method for setting branch routes to the three-stage connect switches constituting this three-stage connect switch system.

Each of a plurality of nodes involved in a communication network is provided with a switch, known as a cross-connect switch, for setting a route to connect any one input line to any one output line. This cross-connect switch is a non-blocking switch which makes it possible to connect any one vacant input line to any one vacant output line without obstructing the connection status of any route already set between any other input line and any other output line, i.e. without requiring a rearrangement to alter any existing route. One example of such non-blocking switch is proposed by C. Clos in his article entitled "A Study of Non-blocking Switching Networks" in The Bell System Technical Journal, March 1953, pp. 406–424. This proposed non-blocking switch is commonly known as the Clos switch, which can meet in a non-blocking state a request for one-to-one connection of one input to one output (usual connection) when the number m of intermediate or middle stage switches satisfies the necessary condition of $m \geq n+g-1$ where n is the number of inputs (input lines) to each input stage switch and g is the number of outputs (output lines) from each output stage switch in a three-stage basic configuration.

Four routing strategies for finding one or more intermediate switches and the condition for the number of intermediate stage switches required to maintain a non-blocking state in setting multiconnection routes for such a three-stage Clos switch system are proposed by F. K. Hwang in his article entitled "Three-stage Multiconnection Networks which are Nonblocking in the Wide Sense" in The Bell Technical Journal, December 1979, pp. 2183–2187. Multiconnection is classified by the form of connecting the input and the output into branching connection (connecting one input line to a plurality of output lines) and confluent connection (connecting a plurality of input lines to one output line), and both are functions usually required by a switching network for the connection of the same sound source or for simplified conferencing. A cross-connect switch requires branching connection to set an alternate route between nodes for use when trouble has occurred on the transmission path or on a similar occasion. If it is intended to maintain a non-blocking state by using Hwang's proposal in a cross-connect switch which requires such branching connection, a greater number of intermediate-stage switches than in the three-stage Clos switch system will inevitably be required.

SUMMARY OF THE INVENTION

An object of the present invention is to provide a method for setting branch routes in a three-stage cross-configuration, connect switch system having this three-stage Clos switch configuration, capable of inhibiting the occurrence of blocking without entailing an increase in the number of intermediate stage switches which is necessary and sufficient for ensuring non-blocking of the three-stage Clos switch system.

According to the invention, there is provided a method for setting branch routes for use in a three-stage cross-connect switch system comprising a group of input stage switches including a plurality of first switches each capable of connecting any one of n input terminals and any one of a plurality of output terminals; a group of output stage switches including a plurality of second switches each capable of connecting any one of a plurality of input terminals and any one of g output terminals; a group of intermediate stage switches including at least $n+g-1$ third switches each capable of connecting any one of a plurality of input terminals electrically connected to the respectively corresponding ones of said output terminals of said first switches to any one of a plurality of output terminals electrically connected to the respectively corresponding ones of said input terminals of said second switches; and a plurality each of input lines and output lines electrically connected respectively to said input terminals of said first switches and said output terminals of said second switches, the method being intended to set branch routes to connect one of said input lines and a plurality of said output lines to the three-stage cross-connect switch system, and provided with: a first step to find out, in response to a connection request involving an input number corresponding to one of said input terminals of said first switches and an output number corresponding to one of said output terminals of said second switches, the switch number and input terminal number of said first switch corresponding to said input number and the switch number and output terminal number of said second switch corresponding to said output number; a second step to judge that said connection request is for said branch route according to whether or not said input number is relevant to an existing route already set; a third step to find out as existing route information the switch number, input terminal number and output terminal number of each of at least one each of said first switches, said second switches and said third switches already used for setting said existing route; a fourth step to select, in response to identity between the switch number of said second switch corresponding to said output number and the switch number of said second switch involved in said existing route information, that second switch; a fifth step, when said second switch cannot be selected, to select, in response to identity between the switch number of said third switch whose output terminal is vacant, perceivable on the basis of the switch number of said second switch corresponding to said output number of said connection request, and the switch number of said third switch, included in said existing route information, that third switch; a sixth step, when said third switch cannot be selected, to select another one of said third switches of which both said input terminal and said output terminal are vacant, each perceivable on the basis of the switch number of said first switch corresponding to said input number of said connection request and the switch number of said second switch corresponding to said output number of said connection request; a seventh step to perform drive control to connect said output terminal of said second switch selected at the fourth step to said input terminal of said second switch having the same switch number as included in said existing route information; an eighth step to perform drive control to connect said output terminal of said third switch selected at the fifth step to said input terminal of said third switch having the same switch number as included in said existing route information and to connect said input terminal of said second switch corresponding to said output terminal of said selected third switch to said output terminal of said second switch corresponding to said output number of said connection request; and a ninth step to perform drive control to connect said output terminal of said first switch corresponding to said input terminal of said third switch selected at the sixth step to said input terminal of said first switch having the same switch number as included in said existing route information, to connect said input terminals and said output terminals of said selected third switch among one another, and to connect said input terminal of one of said second switches corresponding to said output terminal of the selected one of said third switches to said output terminal of one, corresponding to said output number of said connection request, of said second switches.

BRIEF DESCRIPTION OF THE DRAWINGS

The above and other objects and features of the present invention may be fully understood from the following detailed description when taken in conjunction with the accompanying drawings in which:

FIGS. 3, 4, 5, 6, 7, 8 and 9 show status tables to be accumulated in the memory circuit of the system illustrated in FIG. 1.

In the drawings, identical numerals denote identical structural elements.

DETAILED DESCRIPTION OF THE PREFERRED EMBODIMENT

Figure 1:
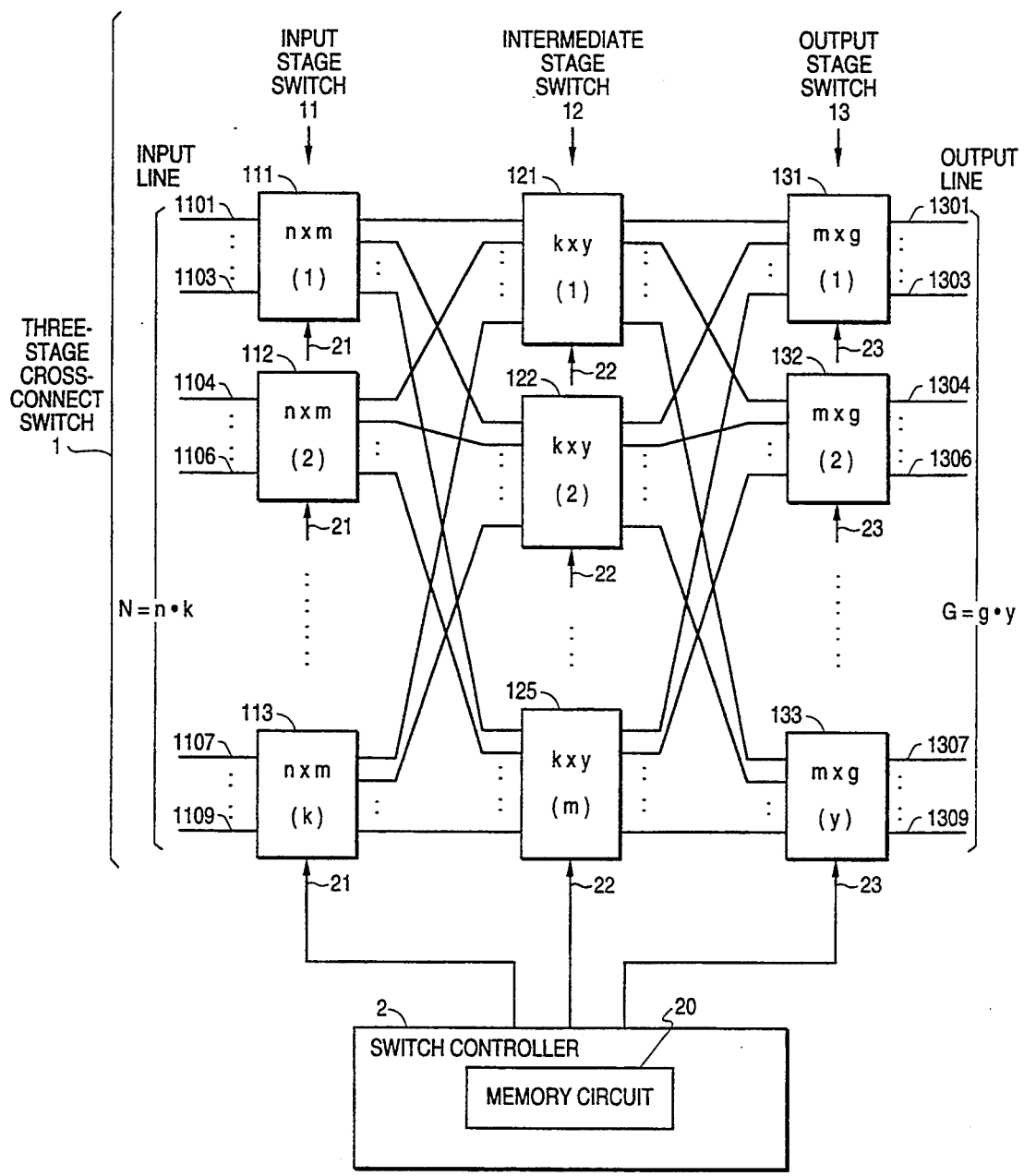
FIG. 1 illustrates a three-stage cross-connect switch system to which a preferred embodiment of the invention is applicable.
Figure 2A:
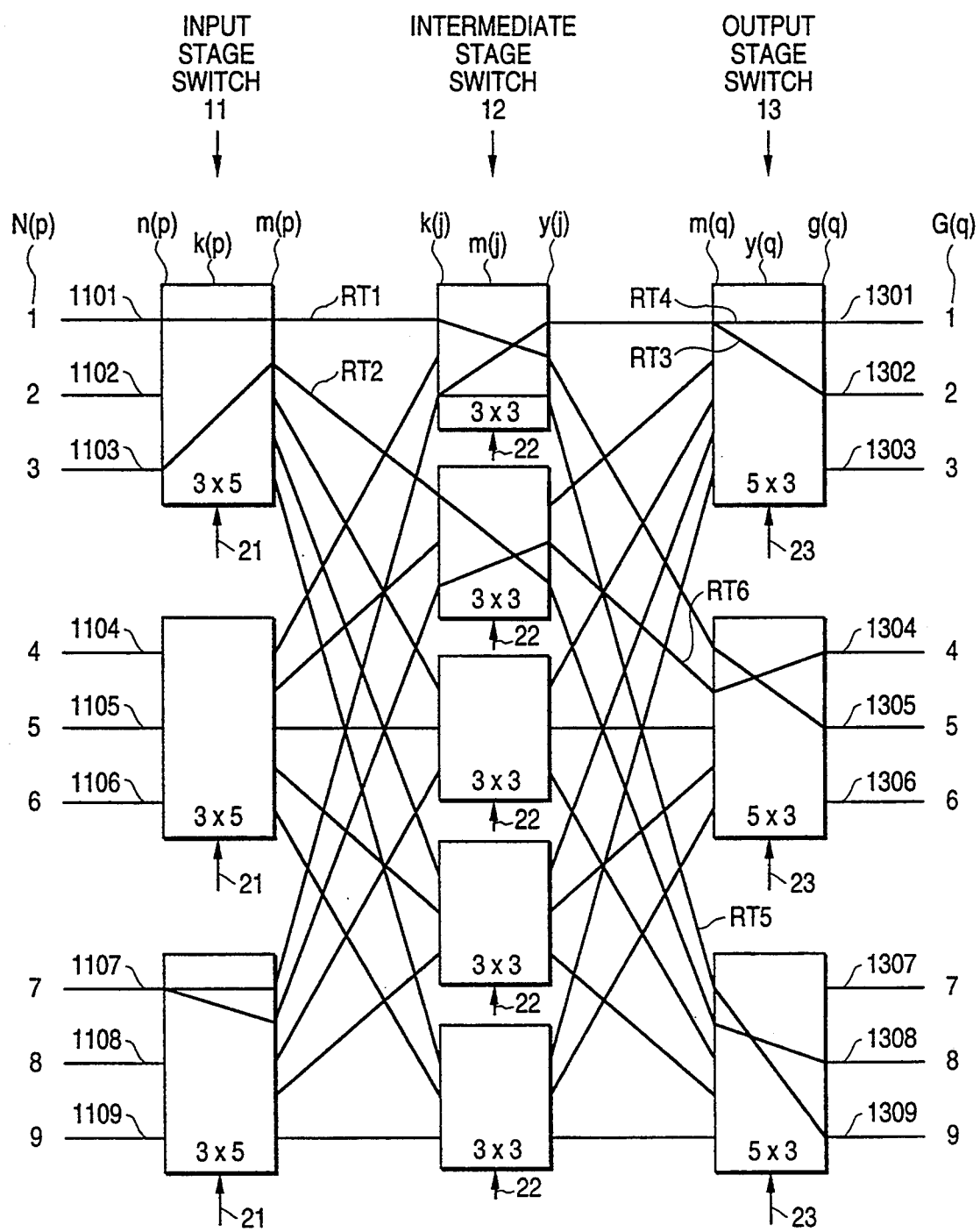
FIGS. 2A, 2B and 2C illustrate examples of route setting in the three-stage cross-connect switches of the system shown in FIG. 1.
Figure 2B:
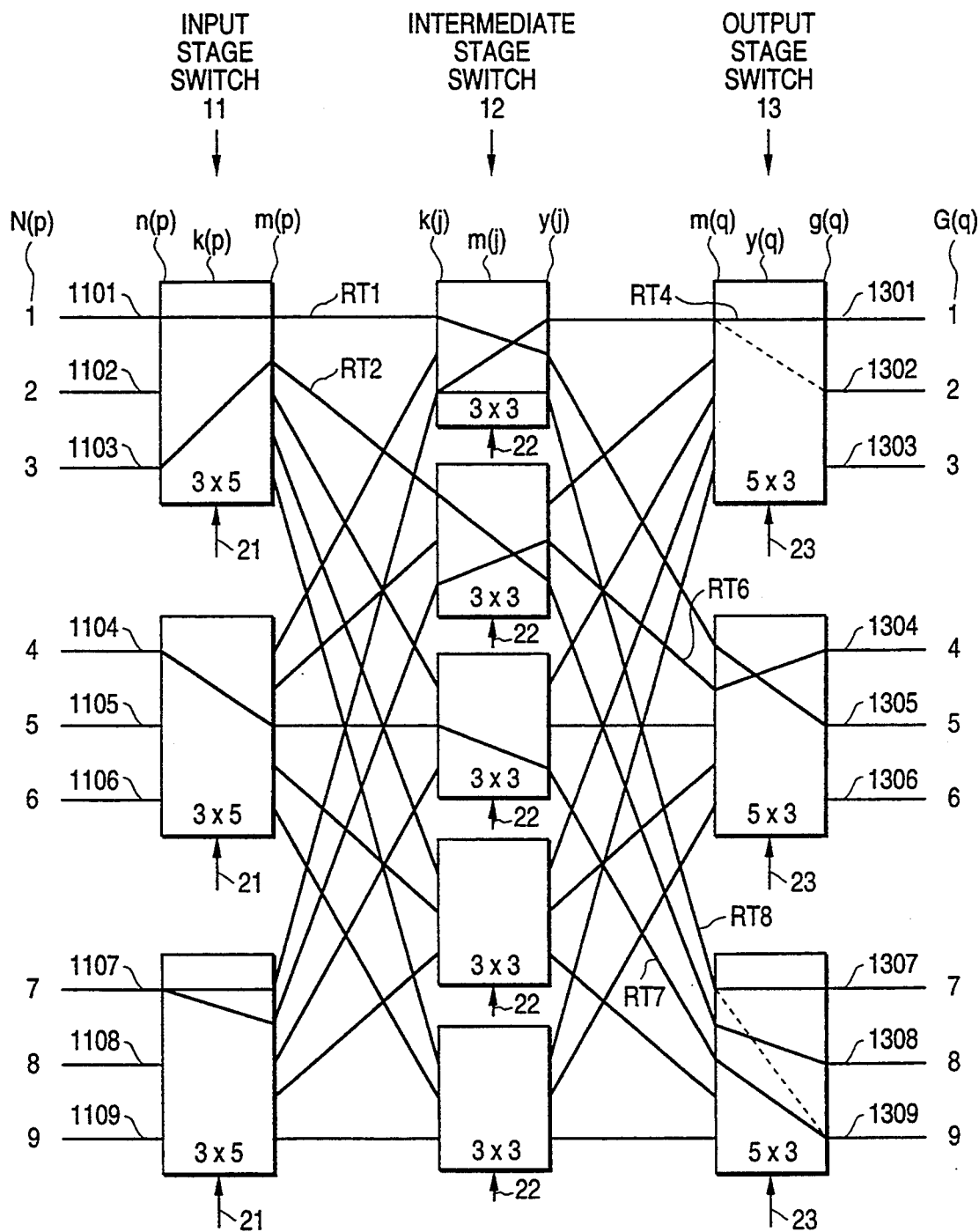
Figure 2C:
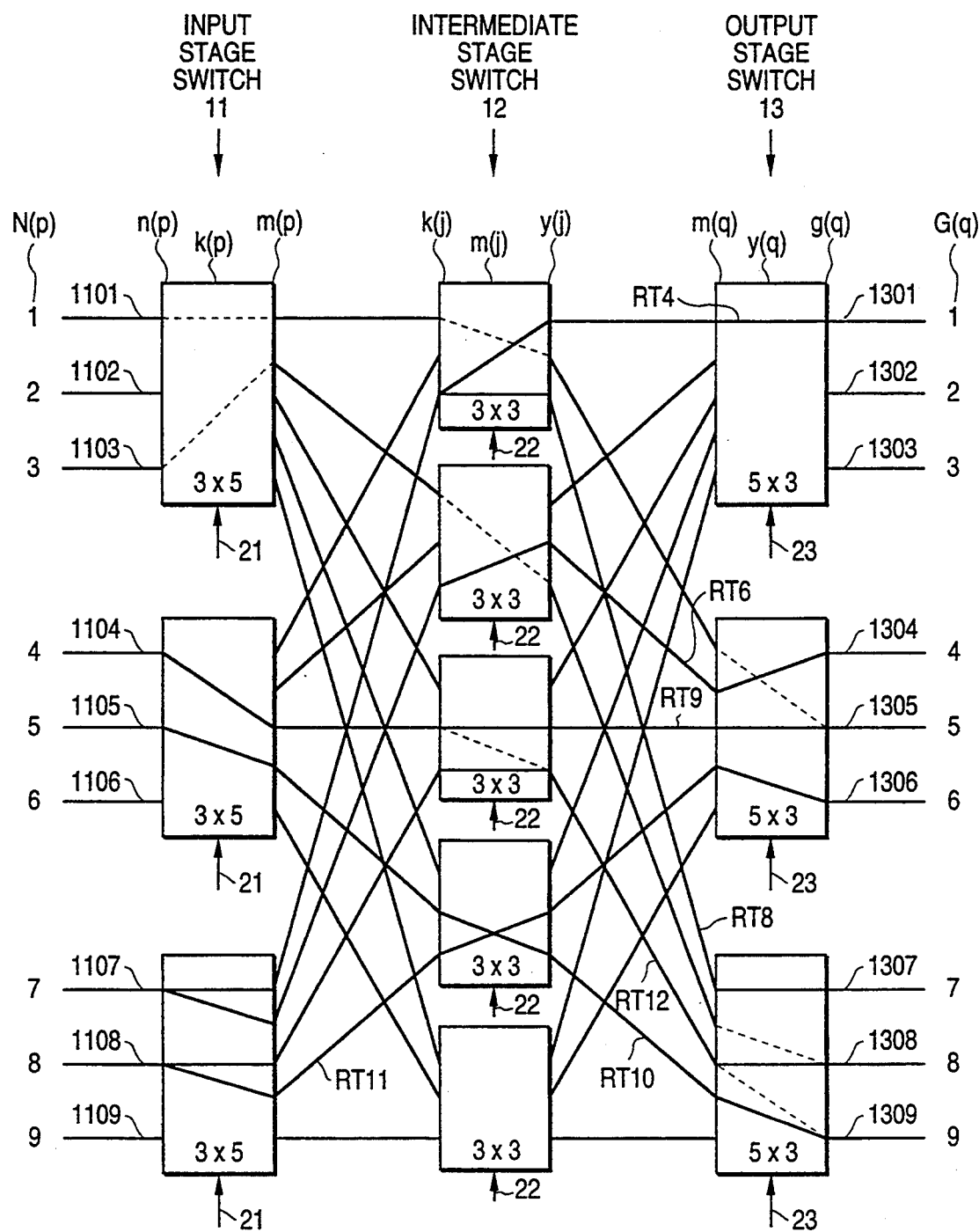

Referring to FIG. 1, a three-stage cross-connect switch system embodying the present invention consists of three-stage cross-connect switches 1 and a switch controller 2. The three-stage cross-connect switches comprise input stage switches 11, intermediate switches 12 and output stage switches 13. The input stage switches 11 have k switches 111, 112 and 113 (k=3 in this embodiment) each having n input lines (input terminals) (n=3 herein), m output lines (output terminals) (m=5 herein) and an n×m switch size. The intermediate stage switches have m switches 121, 122, ... , 125 (m=5 herein) each having k input lines (input terminals) (k=3 herein), y output lines (output terminals) (y=3 herein) and an k×y switch size. The output stage switches 13 have y switches 131, 132 and 133 (y=3 herein) each having m input lines (input terminals) (m=5 herein), g output lines (output terminals) (g=3 herein) and an m×g switch size. This set of three-stage cross-connect switches 1 logically constitutes a matrix of N×G (=9×9) as the total number N of input lines 1101, ... , 1109 to its input stage switches 11 equals n·k (=9) and the total number G of output lines 1301, ... , 1309 from its output stage switches 13 equals g·y (=9). In the cross-connect switches 1 having such a configuration, the number n of input lines to each of the switches 111, 112 and 113 of the input stage switches, the number g of output lines from each of the switches 131, 132 and 133 of the output stage switches 13, and the number m of the switches 121, 122, ... , 125 of the intermediate switches 12 respectively equal 3, 3 and 5, and accordingly the necessary and sufficient condition m≧n+g−1 for non-blocking is satisfied in said three-stage Clos switches. Therefore, even if the switch number m of the intermediate switches 12 is kept to the minimum (i.e. m=5), a non-blocking state can be maintained as long as the connection request is for one-to-one connection. Thus, this set of cross-connect switches 1 can be basically claimed to be non-blocking three-stage cross-connect switches. Incidentally, the input lines 1101, ... , 1109 and the output lines 1301, ... , 1309 in the cross-connect switches 1 are respectively connected to corresponding links between the nodes of the communication network.

The switch control circuit 2, receiving a request from a superior control circuit (not shown) for controlling the overall operation of the nodes of the communication network including said cross-connect switches 1, controls the driving of the cross-connect switches 1 with control signals from control lines 21, 22 and 23. For this purpose, this control circuit 2 has a memory circuit 20 for storing various status tables, to be described in more detail below, required for the control of switch driving (this memory circuit 20 may also be provided independently from the switch control circuit 2).

Route setting and dissolution in the three-stage cross-connect switch system of the above described configuration include one-to-one connection of one out of the plurality of input lines 1101, ... , 1109 accommodated in the input stage switches 11 and one of the plurality of output lines 1301, ... , 1309 accommodated in the output stage switches 13, branching connection of one of these input lines 1101, ... , 1109 and the plurality of these output lines 1301, ... , 1309, and the dissolution of the one-to-one or branching connection. When performing such route setting or dissolution, a route setting/dissolution request REQ(x) including an input number N(p) and an output number G(q) of the three-stage cross-connect switches 1 is entered into the switch control circuit 2 from a superior control circuit.

In the following description of operations with reference to FIGS. 1, 2A, 2B, 2C, ... , and 9, it is supposed that a route RT1 connecting the input line 1101 corresponding to an input number N(p)=1 and the output line 1305 corresponding to an output number G(q)=5 and a route RT2 connecting the input line 1103 corresponding to an input number N(p)=3 and the output line 1308 corresponding to an output number G(q)=8 are already set in the three-stage cross-connect switches 1, and route setting/dissolution requests REQ1, REQ2, ... , REQ15 listed below are sequentially entered into the switch control circuit 2.

Route setting/dissolution requests REQ(x):

(REQ1)—Connection of N(p)=7 and G(q)=2

(REQ2)—Connection of N(p)=7 and G(q)=1

(REQ3)—Connection of N(p)=7 and G(q)=9

(REQ4)—Connection of N(p)=7 and G(q)=4

(REQ5)—Connection of N(p)=7 and G(q)=2

(REQ6)—Connection of N(p)=7 and G(q)=9

(REQ7)—Connection of N(p)=4 and G(q)=9

(REQ8)—Connection of N(p)=7 and G(q)=7

(REQ9)—Connection of N(p)=4 and G(q)=9

(REQ10)—Connection of N(p)=1 and G(q)=5

(REQ11)—Connection of N(p)=4 and G(q)=5

(REQ12)—Connection of N(p)=5 and G(q)=9

(REQ13)—Connection of N(p)=8 and G(q)=6

(REQ14)—Connection of N(p)=3 and G(q)=8

(REQ15)—Connection of N(p)=8 and G(q)=8

The switching circuit 2 sequentially performs the following processings (1-1), . . . , (1-5) to set a route RT3 (see FIG. 2A) in compliance with the request REQ1 (connection between the input number N(p)=7 and the output number G(q)=2) listed first above.

(1-1) Processing for Number Conversion

The control circuit 2, referring to the input number conversion table 201 of FIG. 3, finds out the switch number (SW) K(P)=3 of the input stage switch 11 corresponding to the input number (IN) N(p)=7 and the input terminal number (INT) n(p)=1 of this input stage switch 11, and at the same time, referring to the output number conversion table 202 of FIG. 4, finds out the switch number y(q)=1 of the output stage switch 13 corresponding to the output number (OUT) G(q)=2 and the output terminal number (OUTT) g(q)=2 of this output stage switch 13.

(1-2) Processing for Type Identification

In order to identify the type of this request REQ1, i.e. to judge whether it is for one-to-one connection or for branching connection, the switch control circuit 2 searches the input-output number connection status table 203 of FIG. 5 to check the presence or absence of the input number N(p)=7. Since the input number N(p)=7 is not yet written into this connection status table 203, this request REQ1 is judged to be for one-to-one connection.

(1-3) Processing to Check Set Routes

The switch control circuit 2 first searches the intermediate stage switch connection status table 204 of FIG. 6 for the intermediate stage switch 12 having the smallest switch number m(j) both of whose input terminal number k(j)=3 and output terminal number y(j)=1 are vacant. This connection status table 204 indicates the vacant statuses of the input terminal number k(j) and of the output terminal terminal number y(j) with "0" and their used (blocked) statuses with "1". This searching results in the tentative selection of the intermediate stage switch 12 having a switch number m(j)=1. The switch control circuit 2 then searches the first branch number table 205 of FIG. 7 to judge whether or not the tentatively selected intermediate stage switch 12 of m(j)=1 in switch number has a part in branching connection in any of the input stage switches 11. In this status, the first branch number table 205 indicates that the switch number m(j) of every intermediate stage switch 12 has a branch number BRA=0. Accordingly, the selection of the intermediate stage switch 12 having the switch number m(j)=1 is finalized. By the processing up to this point, the switch control circuit 2 obtains the switch number k(p)=3 and the input terminal number n(p)=1 of the input stage switch 11; the switch number m(j), the input terminal number k(j)=3 and the output terminal number y(j)=1 of the intermediate switch 12; and the switch number y(q)=1 and the output terminal g(q)=2 of the output stage switch 13. It can also perceive the output terminal number m(p)=1 of the input stage switch 11 having the switch number k(p)=3 and the input terminal number m(q)=1 of the output stage switch 13 having the switch number y(q)=1 on the basis of said numbers m(j)=1, k(j)=3 and y(j)=1 of the intermediate stage switch 12 (this, well known to persons skilled in the art, is because of the non-blocking three-stage Clos switch configuration of the three-stage cross-connect switches 1).

(1-4) Switch Control Processing

The switch control circuit 2 sends out cross point closing signals through the control lines 21, 22 and 23 so as to respectively connect the input terminal number n(p)=1 and the output terminal m(p)=1 of the input stage switch 11 having the switch number k(p)=3 to each other, the input terminal number k(j)=3 and the output terminal number y(j)=1 of the intermediate switch 12 having the switch number m(j)=1 to each other, and the input terminal number m(q)=1 and the output terminal number y(q)=2 of the output stage switch 13 having the switch number y(q)=1 to each other. This makes it possible to set the route RT3 to connect the input line 1107 corresponding to the input number N(p)=7 and the output line 1302 corresponding to the output number G(q)=2.

(1-5) Update Processing

The switch control circuit 2 alters the statuses of the inputs terminal number k(j)=3 and the output terminal number y(j)=1 of the switch number m(j)=1 in the intermediate switch connection status table 204 into "1" to indicate used statuses, and writes m(q)=1, y(j)=1, m(j)=1, k(j)=3, m(p)=1, n(p)=1, k(p)=3 and N(p)=7 into the respectively corresponding columns of the output G(q)=2 row in the route connection status table 206 of FIG. 8. This route connection status table 206 stores for each output number G(q) the switch numbers k(p), m(j) and y(q), the input terminal numbers n(p), k(j) and m(q), and the output terminal numbers m(p), y(j) and g(q) of the input stage switch 11, the intermediate state switch 12 and the output stage switch 13, respectively, used in the route setting, and the input number N(p). The switch control circuit 2 also writes the input number N(p)=7 and the output number G(q)=2 in a mutually corresponding way into the input-output number connection status table 203.

Next, the switch control circuit 2 sequentially performs the following processing (2-1), . . . (2-6) to set a route RT4 (see FIG. 2A) in compliance with a request REQ2 listed second above (for connection between the input number N(p)=7 and the output number G(q)=1).

(2-1) Processing for Number Conversion

The control circuit 2, referring to the input number conversion table 201, finds out the switch number k(p)=3 of the input stage switch 11 corresponding to the input number N(p)=7 and the input terminal number n(p)=1 of this input stage switch 11, and at the same time, referring to the output number conversion table 202, finds out the switch number y(q)=1 of the output stage switch 13 corresponding to the output number $G(q)=1$ and the output terminal number $g(q)=1$ of this output stage switch 13.

(2-2) Processing for type identification

In order to identify the type of this request REQ2, the switch control circuit 2 searches the input-output number connection status table 203 to check the presence or absence of the input number $N(p)=7$. Since the input number $N(p)=7$ was already written into this connection status table 203 when the route RT3 corresponding to said first request REQ1 was set, this request REQ2 is judged to be for branching connection.

(2-3) Processing to Check Existing Routes

The switch control circuit 2 first searches the input-output connection status table 203 to check all the output numbers $G(q)$ connected to the input number $N(p)=7$ (in this case only $G(q)=2$). It then obtains as route information the number information written in the columns of the output number $G(q)=2$ in the route connection status table 206. As a result, there are obtained $y(q)=1$, $g(q)=2$, $m(q)=1$, $y(j)=1$, $m(j)=1$, $k(j)=3$, $m(p)=1$, $n(p)=1$ and $k(p)=3$ as route information for the route RT3 to connect the input number $N(p)=7$ and the output number $G(q)=2$.

(2-4) Processing to Search for Branch Route

The switch control circuit 2, on the basis of the route information obtained by the processing to check existing routes (2-3), searches first the output stage switch 13 for a route permitting branching connection of the output number $G(q)=1$ of this request REQ2. The switch control circuit 2, as it perceives the correspondence of the output number $G(q)=1$ of this request REQ2 to the output terminal number $g(q)=1$ of the switch number $y(q)=1$ of the output stage switch 13 and the use of the input terminal number $m(q)=1$ and the output terminal number $g(q)=2$ of the output stage switch 13 having the same switch number $y(q)=1$ by the already set route RT3, selects the output stage switch 13 having the switch number $y(q)=1$ for this branching connection. If the output stage switch 13 cannot be selected for branching connection, the intermediate stage switch 12 and the input stage switch 11 will be searched in that sequence as will be described in more detail below.

(2-5) Switch Control Processing

The switch control circuit 2 sends out from the control line 23 a cross point closing signal selected so as to connect the input terminal number $m(q)=1$ of the switch having the switch number $y(q)=1$, out of those of the output stage switches 13, to the output terminal number $g(q)=1$. This makes it possible to set the route RT4 to branch the route RT3, which connects the input line 1107 corresponding to the input number $N(p)=7$ and the output line 1302 corresponding to the output number $G(q)=2$, in the output stage switch 13 of the switch number $y(q)=1$.

(2-6) Update Processing

The switch control circuit 2 writes $m(q)=1$, $y(j)=1$, $m(j)=1$, $k(j)=3$, $m(p)=1$, $n(p)=1$, $k(p)=3$ and $N(p)=7$ into the respectively corresponding columns of the output $G(q)=1$ row in the route connection status table 206, and also writes the input number $N(p)=7$ and the output number $G(q)=2$ in a mutually corresponding way into the input-output number connection status table 203.

Next, the switch control circuit 2 sequentially performs the following processings (3-1), ..., (3-6) to set a route RT5 (see FIG. 2A) in compliance with a request REQ3 listed third above (for connection between the input number $N(p)=7$ and the output number $G(q)=9$).

(3-1) Processing for Number Conversion

The control curcuit 2, referring to the input number conversion table 201, finds out the switch number $k(p)=3$ of the input stage switch 11 corresponding to the input number $N(p)=7$ and the input terminal number $n(p)=1$ of this input stage switch 11, and at the same time, referring to the output number conversion table 202, finds out the switch number $y(q)=3$ of the output stage switch 13 corresponding to the output number $G(q)=9$ and the output terminal number $g(q)=3$ of this output stage switch 13.

(3-2) Processing for Type Identification

In order to identify the type of this request REQ3, the switch control circuit 2 searches the input-output number connection status table 203 to check the presence or absence of the input number $N(p)=7$. Since the input number $N(p)=7$ was already written into this connection status table 203 when the routes RT3 and RT4 respectively corresponding to said requests REQ1 and REQ2 were set, this request REQ3 is judged to be for branching connection.

(3-3) Processing to Check Existing Routes

The switch control circuit 2 first searches the input-output connection status table 203 to check the output numbers $G(q)=2$ and 1 connected to the input number $N(p)=7$. It then obtains as route information the number information written in the columns of the output numbers $G(q)=2$ and 1 in the route connection status table 206. As a result, there are obtained $y(q)=1$, $g(q)=2$, $m(q)=1$, $y(j)=1$, $m(j)=1$, $k(j)=3$, $m(p)=1$, $n(p)=1$ and $k(p)=3$ as route information for the route RT3 to connect the input number $N(p)=7$ and the output number $G(q)=2$, and also $y(q)=1$, $g(q)=1$, $m(q)=1$, $y(j)=1$, $m(j)=1$, $k(j)=3$, $m(p)=1$, $n(p)=1$ and $k(p)=3$ as route information for the route RT4 to connect the input number $N(p)=7$ and the output number $G(q)=1$.

(3-4) Processing to Search for Branch Route

The switch control circuit 2, on the basis of the route information obtained by said processing to check existing routes (3-3), searches the output stage switches 13 and the intermediate stage switches 12 in that sequence for a route permitting branching connection of the output number $G(q)=9$ of this request REQ3. Thus, since the output number $G(q)=9$ (corresponding to the output stage switch 13 having the switch number $y(q)=3$) of this request REQ3 does not correspond to the output stage switch 13 having the switch number $y(q)=1$ used for the routes RT3 and RT4, the output stage switch 13 having this number $y(q)=1$ cannot be used for this branching connection. Therefore, the switch control circuit 2 refers to the intermediate stage connection status table 204 to check whether or not the output terminal number $y(j)=3$ of the intermediate stage switch 12 having the switch number $m(j)=1$, used for the routes RT3 and RT4, is vacant. Since the output terminal number $y(j)=3$ of the intermediate stage switch 12 having the switch number $m(j)=1$ is vacant at this time, the intermediate switch 12 having this number m(j)=1 is selected for this branching connection. Incidentally, if the output terminal number y(j)=3 of this intermediate stage switch 12 is in use, the input stage switch 11 will be searched for an available branch route as will be described in more detail below.

(3-5) Switch Control Processing

The switch control circuit 2 sends out through the control lines 22 and 23 cross point closing signals selected so as to connect the input terminal number k(j)=3 of the switch having the switch number m(j)=1, out of those of the intermediate stage switches 12, to the output terminal number y(j)=3, and at the same time to connect the output terminal number g(q)=3 to the input terminal number m(q)=1 of the switch having the switch number y(q)=3, out of those of the output stage switches 13. This makes it possible to set the route RT5 to branch the input line 1107, corresponding to the input number N(p)=7 of the routes RT3 and RT4, to the output line 1309, corresponding to the output number G(q)=9, in the intermediate stage switch 12 of the switch number m(j)=1.

(3-6) Update Processing

The switch control circuit 2 alters the status of the output terminal number y(j)=3 of the switch number m(j)=1 in the intermediate switch connection status table 204 into "1" indicating a used status, and writes m(q)=1, y(j)=3, m(j)=1, k(j)=3, m(p)=1, n(p)=1, k(p)=3 and N(p)=7 into the respectively corresponding columns of the output G(q)=9 row in the route connection status table 206. The switch control circuit 2 also writes the input number N(p)=7 and the output number G(q)=9 in a mutually corresponding way into the input-output number connection status table 203.

Next, the switch control circuit 2 sequentially performs the following processings (4-1), . . . , (4-7) to set a route RT6 (see FIG. 2A) in compliance with a request REQ4 listed fourth above (for connection between the input number N(p)=7 and the output number G(q)=4).

(4-1) Processing for Number Conversion

The control circuit 2, referring to the input number conversion table 201, finds out the switch number k(p)=3 of the input stage switch 11 corresponding to the input number N(p)=7 and the input terminal number n(p)=1 of this input stage switch 11, and at the same time, referring to the output number conversion table 202, finds out the switch number y(q)=2 of the output stage switch 13 corresponding to the output number G(q)=4 and the output terminal number g(q)=1 of this output stage switch 13.

(4-2) Processing for Type Identification

In order to identify the type of this request REQ4, the switch control circuit 2 searches the input-output number connection status table 203 to check the presence or absence of the input number N(p)=7. Since the input number N(p)=7 was already written into this connection status table 203 when the routes RT3, RT4 and RT5 respectively corresponding to said requests REQ1, REQ2 and REQ3 were set, this request REQ4 is judged to be for branching connection.

(4-3) Processing to Check Existing Routes

The switch control circuit 2 first searches the input-output connection status table 203 to check the output numbers G(q)=2, 1 and 9 connected to the input number N(p)=7. It then obtains as route information the number information written in the columns of the output numbers G(q)=2, 1 and 9 in the route connection status table 206. As a result, there are obtained y(q)=1, g(q)=2, m(q)=1, y(j)=1, m(j)=1, k(j)=3, m(p)=1, n(p)=1 and k(p)=3 as route information for the route RT3 to connect the input number N(p)=7 and the output number G(q)=2; y(q)=1, g(q)=1, m(q)=1, y(j)=1, m(j)=1, k(j)=3, m(p)=1, n(p)=1 and k(p)=3 as route information for the route RT4 to connect the input number N(p)=7 and the output number G(q)=1; and also y(q)=3, g(q)=3, m(q)=1, y(j)=3, m(j)=1, k(j)=3, m(p)=1, n(p)=1 and k(p)=3 as route information for the route RT5 to connect the input number N(p)=7 and the output number G(q)=9.

(4-4) Processing to Search for Branch Route

The switch control circuit 2, on the basis of the route information obtained by the processing to check existing routes (4-3), searches the output stage switches 13, the intermediate stage switches 12 and the input stage switches 11 in that sequence for a route permitting branching connection of the output number G(q)=4 of this request REQ4. In further detail, since the output number G(q)=4 (corresponding to the output stage switch 13 having the switch number y(q)=2) of this request REQ4 does not correspond to the output stage switches 13 having the switch numbers y(q)=1 and 3 used for the routes RT3, RT4 and RT5, the output stage switches 13 having these numbers y(q)=1 and 3 cannot be selected for this branching connection. Then, the switch control circuit 2 refers to the intermediate stage connection status table 204 to check whether or not the output terminal number y(j)=2 of the intermediate stage switch 12 having the switch number m(j)=1, used for the routes RT3, RT4 and RT5, is vacant. Since the output terminal number y(j)=2 of the intermediate stage switch 12 having the switch number m(j)=1 is in use for the route RT1 (see FIG. 2A), the intermediate switch 12 having this number m(j)=1 cannot be selected for this branching connection. As the switch control 2 is aware of the accommodation of the input line 1107 corresponding to the input number N(p)=7 by the input stage switch 11 having the switch number k(p)=3 and the accommodation of the output line 1304 corresponding to the output number G(q)=4 by the output stage switch 13 having the switch number y(q)=2, the switch control circuit 2 searches the intermediate stage switch connection status table 204 6 for the intermediate stage switch 12 having the smallest switch number both of whose input terminal number k(j)=3 and output terminal number y(j)=2 are vacant. As a result, there is obtained the intermediate stage switch 12 having the switch number m(j)=2. The intermediate stage switch having this number enables the input stage switch 13 having the switch number k(p)=3 to achieve branching connection in compliance with said request REQ4.

(4-5) Judgment of Possibility of Blocking and Alarm Processing

When performing branching connection at the input stage 11, the switch control circuit 2 adds "1" to the branch number BRB of the pertinent switch number k(p) in the second branch number table of FIG. 9 in order to judge the possibility of blocking the subsequent setting of any new route. This enables the switch control circuit 2, when the branch number BRB is greater than {m−(2n−1)} (herein m is the number of intermediate stage switches and n, the number of input lines to each of the input stage switches), i.e. when it is greater than "0" in this embodiment, to alarm the superior control circuit against the possibility of blocking, and thereby warns the user of this system.

(4-6) Switch Control Processing

The switch control circuit 2 sends out through the control lines 21, 22 and 23 cross point closing signals selected so as to connect the output terminal number m(p)=2 to the input terminal number n(p)=1 of the switch having the switch number k(p)=3, out of those of the input stage switches 11; to connect the output terminal number y(j)=2 to the input terminal k(j)=3 of the switch having the switch number m(j)=2, out of those of the intermediate stage switches 12; and at the same time to connect the output terminal number g(q)=1 to the input terminal number m(q)=2 of the switch having the switch number y(q)=2, out of those of the output stage switches 13. This makes it possible to set the route RT6 to branch the input line 1107, corresponding to the input number N(p)=7 of the routes RT3, RT4 and RT5, to the output line 1304, corresponding to the output number G(q)=4, in the input stage switch 11 of the switch number k(p)=3.

(4-7) Update Processing

The switch control circuit 2 alters the statuses of the input terminal number k(j)=3 and the output terminal number y(j)=3 of the switch number m(j)=2 in the intermediate switch connection status table 204 into "1" indicating a used status, and writes m(q)=2, y(j)=2, m(j)=2, k(j)=3, m(p)=2, n(p)=1, k(p)=3 and N(p)=7 into the respectively corresponding columns of the output G(q)=4 row in the route connection status table 206. The switch control circuit 2 also writes the input number N(p)=7 and the output number G(q)=4 in a mutually corresponding way into the input-output number connection status table 203. Further, since branching connection was performed in the input stage switch 11 through the intermediate switch 12 having the switch number m(j)=2 to set the route RT6 in compliance with this request REQ4, the switch control circuit 2 adds "1" to the branch number BRA of the switch number m(j)=2 in the first branch number table 205, and also adds "1" to the branch number BRA of the switch number m(j)=1 of the intermediate switch 12 relevant to the routes RT3, RT4 and RT5, which have been subjected to branching connection in the input stage switch 11 having the same switch number k(p)=3 as for the route RT6 as a result of the setting of the route RT6 in compliance with this request.

Next, the switch control circuit 2 performs the following processings (5-1), . . . (5-5) to comply with a request REQ5, listed fifth above (for dissolving the connection between the input number N(p)=7 and the output number G(q)=2), i.e. to dissolve the route RT3 previously set in compliance with the aforementioned request REQ1.

(5-1) Processing for number conversion

The control circuit 2, performing the same processing as in setting the route RT3 in compliance with the above-mentioned request REQ1 (connection of the input number N(p)=7 and the output number G(q)=2), finds out the switch number k(p)=3 and the input terminal number n(p)=1 of the input stage switch 11 and the switch number y(q)=1 and the output terminal number g(q)=2 of the output stage switch 13.

(5-2) Processing for Type Identification

In order to identify the type of this request REQ5, the switch control circuit 2 searches the input-output number connection status table 203 to check the presence or absence of the input number N(p)=7. Since the input number N(p)=7 was already written into this connection status table 203 when the routes RT3, RT4, RT5 and RT6 respectively corresponding to said requests REQ1, REQ2, REQ3 and REQ4 were set, this request REQ4 is judged to be for dissolution of branching connection.

(5-3) Processing to Search for Route to be Dissolved

The switch control circuit 2 first searches the input-output number connection status table 203 for the output numbers G(q)=2, 1, 9 and 4 connected to the input number N(p)=7. Then it obtains as route information the number information written in the columns of the output numbers G(q)=2, 1, 9 and 4 in the route connection status table 206. As the switch control circuit 2, on the basis of the route information of the routes RT3, RT4, RT5 and RT6, perceives that the route RT3, which is to be dissolved, is branch-connected to the route RT4 at the output stage switch 13 having the switch number y(q)=1, to the route RT5 at the intermediate stage switch 12 having the switch number m(j)=1 and to the route RT6 at the input stage switch 11 having the switch number k(p)=3, it selects as the object of dissolution only the connection between the input terminal number m(q)=1 and the output terminal number g(q)=2 of the output stage switch 13 having the switch number y(q)=1.

(5-4) Switch Control Processing

The switch control circuit 2 sends out through the control line 23 a cross point dissolving signal selected so as to release the connection between the input terminal number m(q)=1 and the output terminal number g(q)=2 of the switch having the switch number y(q)=1, out of those of the output stage switches 13. This makes it possible to dissolve the route RT3 branch-connecting the input line 1107, corresponding to the input number N9p)=7, and the output line 1302, corresponding to the output number G(q)=2.

(5-5) Update Processing

The switch control circuit 2 erases the contents written in the columns corresponding to the output number G(q)=2 in the route connection status table 206, and also erases the contents written in the input-output number connection status table 203 for the input number N(p)=7 and the output number G(q)=2.

A request REQ6 listed sixth above (for dissolving the connection between the input number N(p)=7 and the output number G(q)=9) can be complied with, i.e. the dissolution of the route RT5 already set in response to said request REQ3 can be processed, in the same way as in the dissolution of the branching connection route RT3 in compliance with said request REQ5. It requires, however, update processing to alter the status of the output terminal number y(j)=3 of the switch number m(j)=1 in the intermediate stage switch connection status table 204 to "0" denoting vacancy.

A request REQ7, listed seventh above, is for the setting of a route RT7 (see FIG. 2B) to connect the input line 1104, corresponding to the input line N(p)=4, and the output line 1309, corresponding to the output number G(q)=9. The switch control circuit 2 performs number conversion processing (1-1) and type identification processing (1-2) in the same manner as in the case of, for instance, setting the route RT3 in compliance with said request REQ1, and determines this request REQ7 to be for one-to-one connection. Therefore, the intermediate switch connection status table 204 is searched next for a vacant route. In this set route search processing (1-3) is searched for one of the intermediate stage switches 13 both of whose input terminal number k(j)=2 and output terminal number y(j)=3 are vacant. Reference to the intermediate stage switch connection status table 204 at this time reveals that both the input terminal number k(j)=2 and the output terminal number y(j)=3 of the intermediate stage switches 12 having the switch numbers m(j)=1, 3, 4 and 5 are vacant, and the intermediate stage switch 12 with the smallest switch number m(j)=1 is tentatively selected. However, the switch control circuit 2, referring to the first branch number table 205 in which the branch number BRA for the switch number m(j)=1 is "1", perceives that this intermediate stage switch 12 has a part in the branching connection at the input stage switch 11. As a result, the switch number m(j)=1 is excluded, and the intermediate stage switch 12 having the next smallest switch number m(j)=3 is selected. Incidentally, when only the switch number m(j)=1 is vacant, the intermediate stage switch 12 having this switch number is selected. The switch control processing (1-4) and update processing (1-5) which follow are the same as for said request REQ1.

A request REQ8 listed eight above is for the setting of a route RT8 (see FIG. 2B) for connecting the input line 1107, corresponding to the input number N(p)=7, and the output line 1307, corresponding to the output number G(q)=7. The setting of this route RT8 is branching connection to the already set routes RT4 and RT6, and is processed in basically the same way as the branching connection of the route RT 5 to the routes RT3 and RT4 in compliance with said REQ3. This route RT8, since its output number G(q)=7 corresponds to neither of the output stage switches 13 having the switch number y(q)=1 and 3, respectively used for setting the routes RT4 and RT6, is branch-connected at the intermediate stage switch 12 having the switch number m(j)=1, used for setting the route RT4. The branching connection at this intermediate stage switch 12 is made possible by the avoidance of the use of the intermediate stage switch 12 having the switch number m(j)=1, which has a part in branching connection at the input stage switch 11 for setting the route RT7 in compliance with said request REQ7. As a result, it can be avoided to perform branching connection for setting the route RT8 at the switch number k(P)=3 of the input stage switch 11 (using the input terminal number n(p)=1 and the output terminal number m(p)=3).

A request REQ9 listed ninth above is for the dissolution of the route RT7 connecting the input line 1104, corresponding to the input number N(p)=4, and the output line 1309, corresponding to the output number G(q)=9. This request REQ9, unlike said requests REQ5 and REQ6 which are for the dissolution of the routes RT3 and RT5, both for branching connection, is for the dissolution of a one-to-one connecting route, and its processing is accordingly simple. Thus, the switch control circuit 2 performs number conversion processing (5-1) and type identification processing (5-2) in the same way as in dissolving the route RT3 in compliance with said request REQ5, and determines this request REQ9 to be for the dissolution of a one-to-one connecting route. Then the switch control circuit 2, in the processing to search for the route to be dissolved (5-3), searches the input-output number connection status table 203 for the output number G(q)=9 connected to the input number N(p)=4, and obtains as route information the number information written in the columns of the output number G(q)=9 in the route connection status table 206. In switch control processing (5-4), the connections relevant to this route RT 7 at the input stage switch 11 having the switch number k(p)=2, the intermediate stage switch 12 having the switch number m(j)=3 and the output stage switch 13 having the switch number y(q)=3 are dissolved. In update processing (5-5), the input terminal number k(j)=2 and the output terminal y(j)=3 of the switch number m(j)=3 in the intermediate switch connection status table 204 are altered to "0" denoting vacancy; the contents written in the columns corresponding to the output number G(q)=9 in the route connection status table 206 are erased; and the contents written in the input-output number connection status table 203 for the input number N(p)=4 and the output number G(q)=9 are also erased.

Among requests REQ10 through REQ15, respectively listed 10th through 15th above, said request REQ10, i.e. the request for dissolution of the connection of the route RT1 between the input line 1101 corresponding to the input number N(p)=1 and the output line 1305 corresponding to the output number G(q)=5, and said request REQ14, i.e. the request for dissolution of the connection of the route RT2 between the input line 1103 corresponding to the input number N(p)=3 and the output line 1308 corresponding to the output number G(q)=8, can be processed in the same manner as in dissolving the route RT7 in compliance with said request REQ 9. Said request REQ11, i.e. the request for setting of the route RT9 (see FIG. 2C) between the input line 1104 corresponding to the input number N(p)=4 and the output line 1305 corresponding to the output number G(q)=5 can be processed in the same way as in setting the route RT7 in compliance with said request REQ7. Similarly, said request REQ12, i.e. the request for setting the route RT10 between the input line 1105 corresponding to the input number N(p)=5 and the output line 1309 corresponding to the output number G(p)=9, and said request REQ13, i.e. the request for setting the route RT11 between the input line 1108 corresponding to the input number N(p)=8 and the output line 1306 corresponding to the output number G(q)=6, can be processed in the same manner as in setting the RT3 in compliance with said request REQ1. Further, said request REQ 15, i.e. the request for setting the route RT12 between the input line 1108 corresponding to the input number N(p)=8 and the output line 1308 corresponding to the output number G(q)=8, can be processed in the same way as in setting the route RT6 in compliance with said request REQ4.

Even after the setting and dissolution of routes pertaining to said requests REQ1, . . . , REQ15 have been performed, one-to-one connection or branching connection can be effected between the input line 1109 corresponding to the input number N(p)=9 and at one or more of the output lines 1302 and 1303 respectively corresponding to the output numbers $G(q)=2$ and 3 in a vacant status.

In the above description of the preferred embodiment of the present invention, said tables 203, 204, 205, 206 and 207 represent the statuses at the time of completion of processings in compliance with said request REQ4, and the statuses are updated every time the processings responding to each of the other requests REQ5, . . . , REQ15 are completed.

As hitherto described, the present invention, setting a branch route in a three-stage cross-connect switch system having a non-blocking three-stage Clos switch configuration, makes it possible to restrain the blocking of any route setting request newly emerging for one-to-one connection or branching connection by searching output stage switches first, intermediate stage switches second and input stage switches third for points of branching connection with existing routes in order to avoid, as far as practicable, the use of the output terminals of input stage switches having the same switch number.

Other alternatives and modifications to the above-mentioned embodiment can be made within the scope of the invention defined by the appended claims.

What is claimed is:

1. A method for setting branch routes for use in a three-stage cross-connect switch system comprising a group of input stage switches including a plurality of first switches, each of said first switches having n input terminals selectably connected to any one of a plurality of output terminals, a group of output stage switches including a plurality of second switches, each of said second switches having a plurality of input terminals selectably connected to any one of g output terminals, a group of intermediate stage switches including at least $n+g-1$ third switches, each of said third switches having a plurality of input terminals electrically connected to respectively corresponding ones of said output terminals of said first switches, said input terminals being selectably connected to any one of a plurality of output terminals, said output terminals being electrically connected to respectively corresponding ones of said input terminals of said second switches, and a plurality of input lines and output lines electrically connected respectively to said input terminals of said first switches and said output terminals of said second switches, the method of setting branch routes to connect one of said input lines and a plurality of said output lines to the three-stage cross-connect switch system, comprising the steps of:

(1) determining, in response to a connection request involving an input number corresponding to one of said input terminals of said first switches and an output number corresponding to one of said output terminals of said second switches, a switch number and input terminal number of said one of said first switches corresponding to said input number, and a switch number and output terminal number of said one of said second switches corresponding to said output number;

(2) determining if said connection request is for said branch route according to whether or not said input number relates to an existing route;

(2) retrieving existing route information including the switch number, input terminal number and output terminal number of each of at least a first switch, a second switch and a third switch, of said first, second and third switches, respectively, already used for setting said existing route;

(4) selecting, when there is identity between the switch number of said second switch corresponding to said output number and the switch number of said second switch involved in said existing route information, that second switch;

(5) selecting, when said second switch cannot be selected in step 4, when there is identity between the switch number of said third switch with a vacant output terminal number corresponding to the switch number of said second switch corresponding to said output number of said connection request, and the switch number of said third switch included in said existing route information, that third switch;

(6) selecting another one of said third switches when said third switch cannot be selected in step 5, with vacant input and output terminal numbers corresponding respectively to the switch number of said first switch corresponding to said input number of said connection request and the switch number of said second switch corresponding to said output number of said connection request;

(7) performing drive control to connect said output terminal of said second switch selected at the fourth step to said input terminal of said second switch having the same switch number as included in said existing route information;

(8) performing drive control to connect said output terminal of said third switch selected at the fifth step to said input terminal of said third switch having the same switch number as included in said existing route information and to connect said input terminal of said second switch corresponding to said output terminal of said selected third switch to said output terminal of said second switch corresponding to said output number of said connection request; and (9) performing drive control to connect said output terminal of said first switch corresponding to said input terminal of said third switch selected at the sixth step to said input terminal of said first switch having the same switch number as included in said existing route information, to connect said input terminal to said output terminal of said selected third switch, and to connect said input terminal of one of said second switches corresponding to said output terminal of the selected one of said third switches to said output terminal of said second switch, corresponding to said output number of said connection request.

2. A method for setting branch routes in a three-stage cross-connect switch system, as claimed in claim 1, wherein step 6 further comprises selecting said another one of said third switches with the smallest switch number.

3. A method for setting branch routes in a three-stage cross-connect switch system, as claimed in claim 1, further comprising the steps of:

(10) judging, according to whether said input number of said connection request is relevant to said existing route, whether said connection request is for connection of a route for connection of one of said input lines of said first switches and one of said output lines of said second switches; and

(11) setting said route by selecting one of said third switches, which has the smaller switch number and which both an input terminal and an output terminal are vacant and correspond respectively to the switch number of said first switch corresponding to said input number of said connection request and the switch number of said second switch corresponding to said output number of said connection request, excluding said third switch involved in the setting of a branch route in said first switch.

* * * * *